United States Patent [19]

Daniehl

[11] Patent Number: 5,036,716
[45] Date of Patent: Aug. 6, 1991

[54] INFINITELY VARIABLE TRANSMISSION

[76] Inventor: Michael Daniehl, 639 S. Irena, Redondo Beach, Calif. 90277

[21] Appl. No.: 564,357
[22] Filed: Aug. 8, 1990
[51] Int. Cl.$^5$ ...................... F16H 21/12; F16H 27/00
[52] U.S. Cl. .......................................... 74/63; 74/112
[58] Field of Search ................... 74/63, 112, 119, 121, 74/594.2, 594.3

[56] References Cited

U.S. PATENT DOCUMENTS

| | | | |
|---|---|---|---|
| 1,162,233 | 11/1915 | Goddu | 74/63 X |
| 1,508,220 | 9/1924 | Frey | 74/112 |
| 4,697,469 | 10/1987 | Takamiya et al. | 74/63 X |

FOREIGN PATENT DOCUMENTS

724757  5/1932  France .................. 74/121

*Primary Examiner*—Allan D. Herrmann
*Assistant Examiner*—David W. Laub
*Attorney, Agent, or Firm*—Charles H. Thomas

[57] ABSTRACT

A mechanical transmission is provided to transmit rotary mechanical motion at a mechanical advantage that is selectively and infinitely variable. An output shaft in an output drive mounting frame is driven by a rotary input drive in an input drive mounting plate. The mechanical advantage at which power is transmitted is governed by the position of the output drive mounting frame relative to the input drive mounting plate. A plurality of separate intermediate links, all having toothed gear sections are driven by the input drive and are sequentially and discontinuously brought into meshed engagement with a drive output gear. The intermediate links are all rotatable independently of each other about a common axis on the output drive mounting frame. Rotation and counter rotation of a worm adjustment to any infinite number of positions shifts the relative positions of the axis of rotation of the power input transfer gear and the axis of rotation of the intermediate links, thereby in turn controlling the mechanical advantage at which power is transmitted.

19 Claims, 4 Drawing Sheets

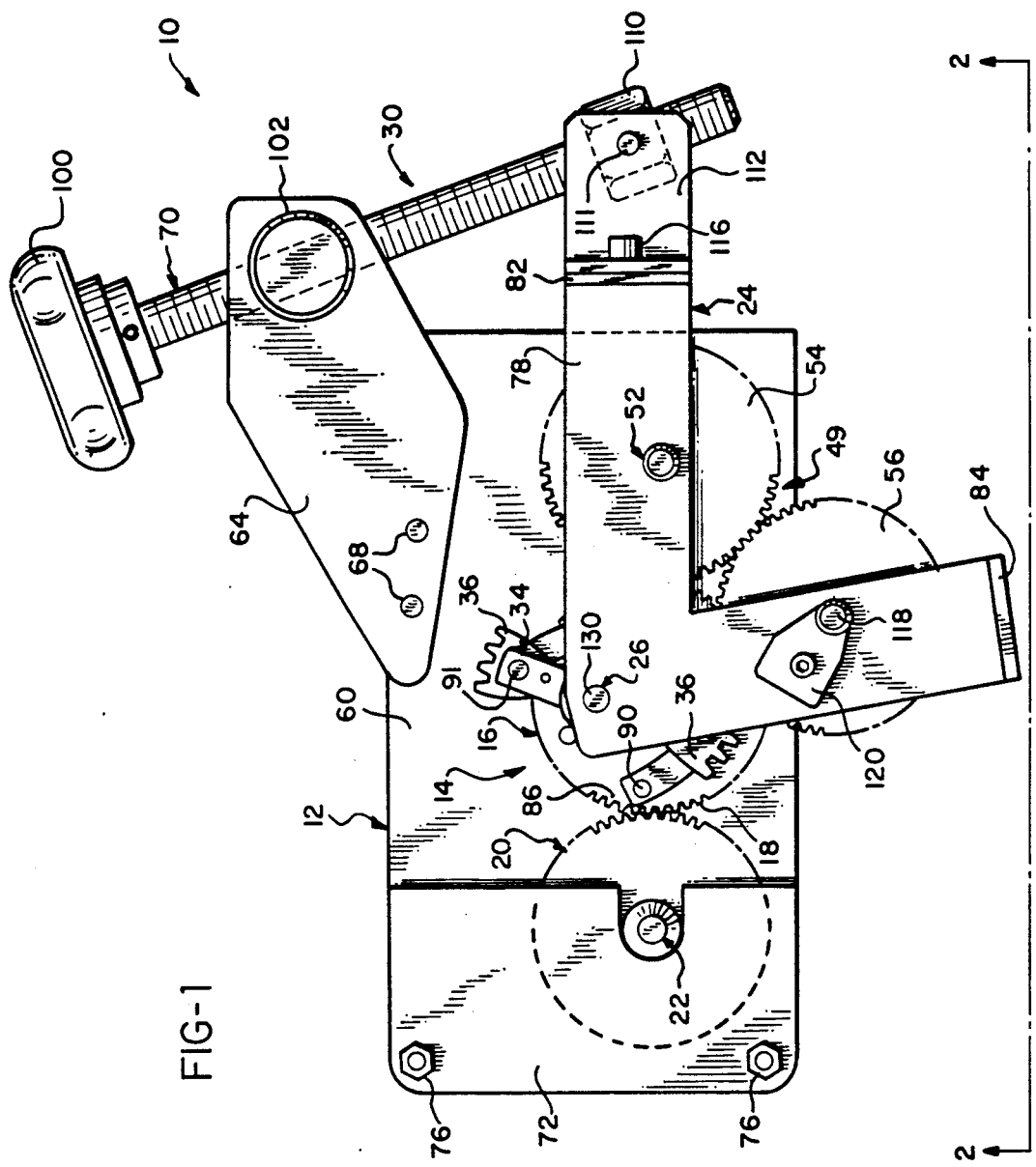

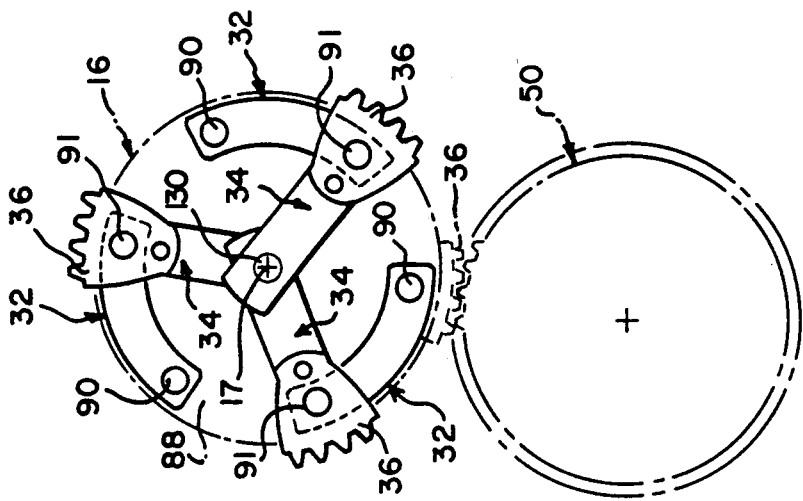
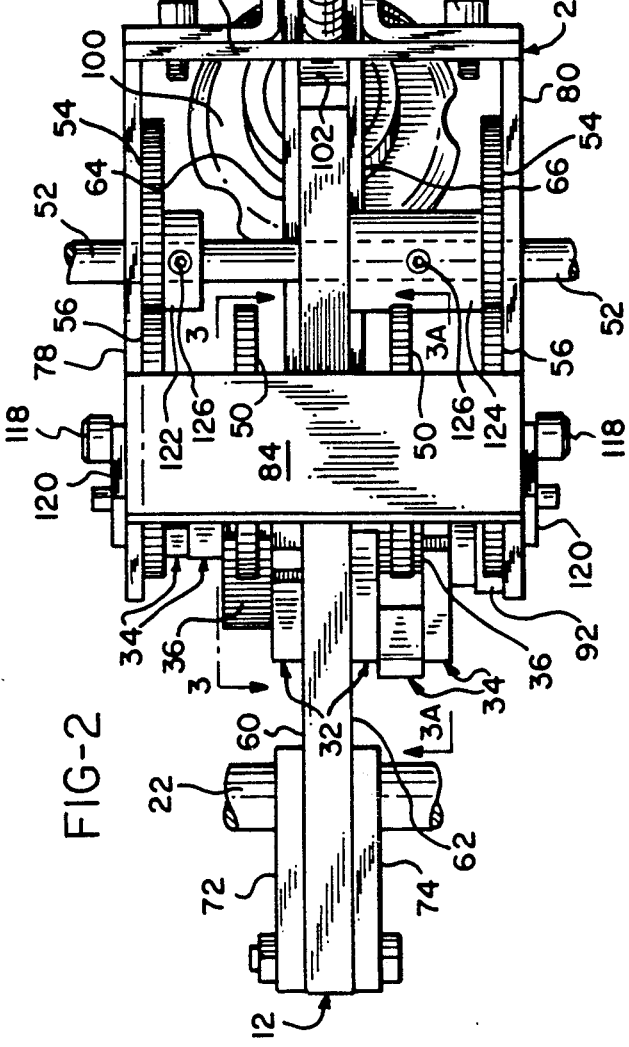
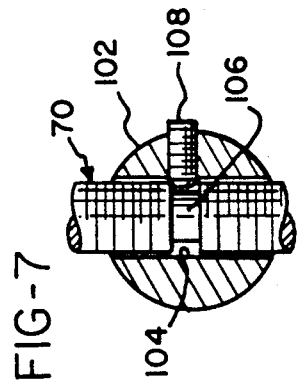

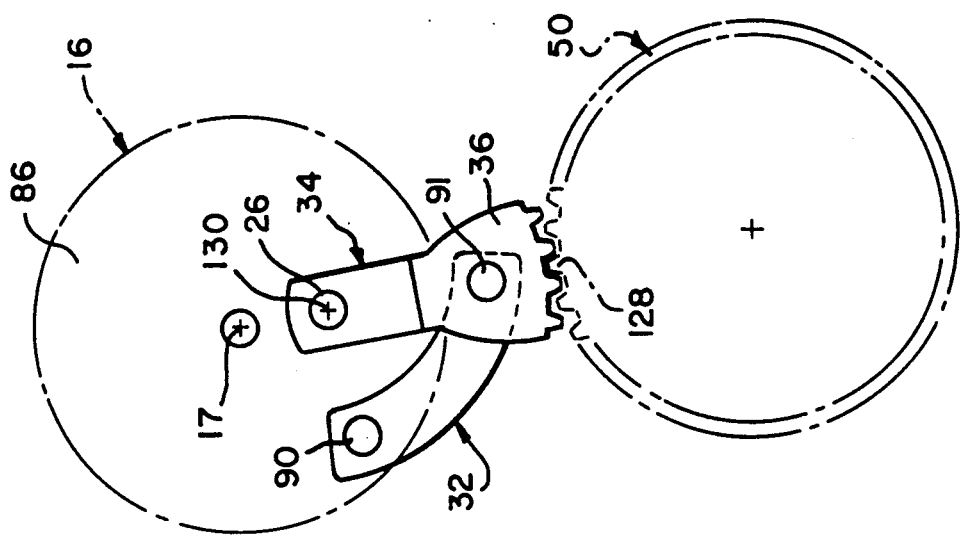
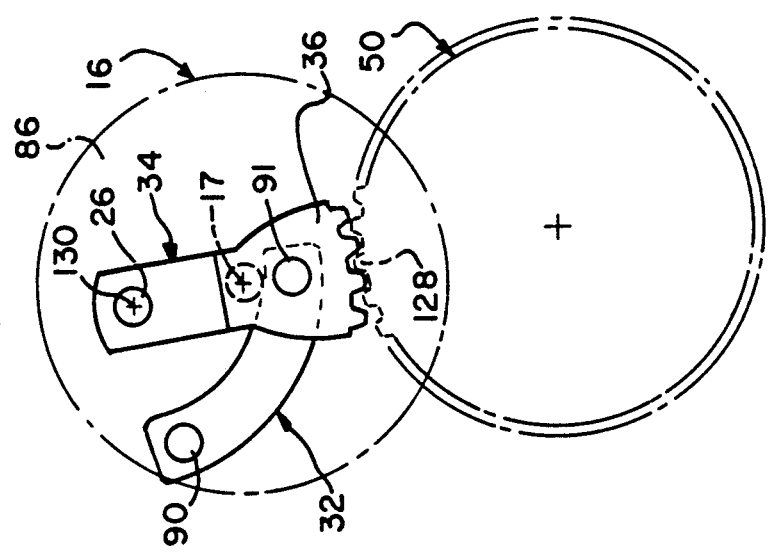
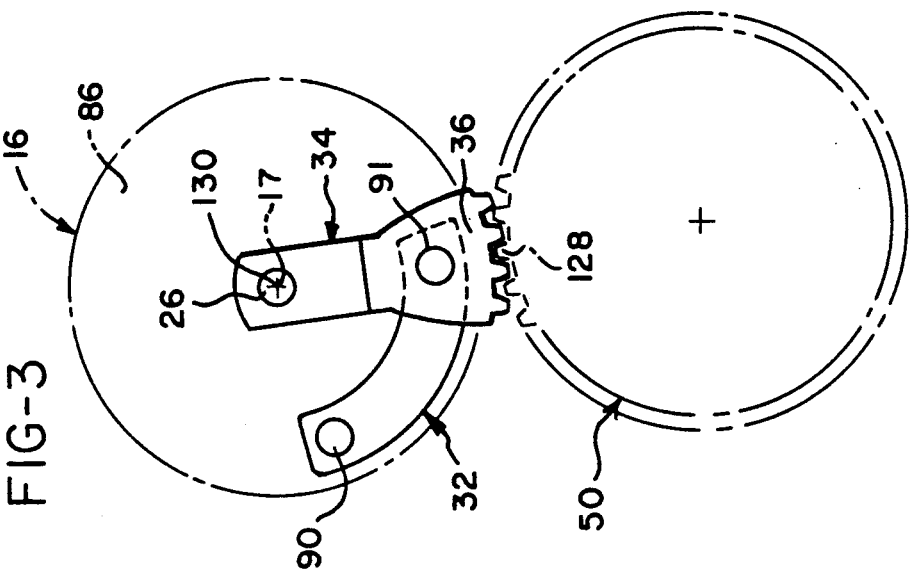

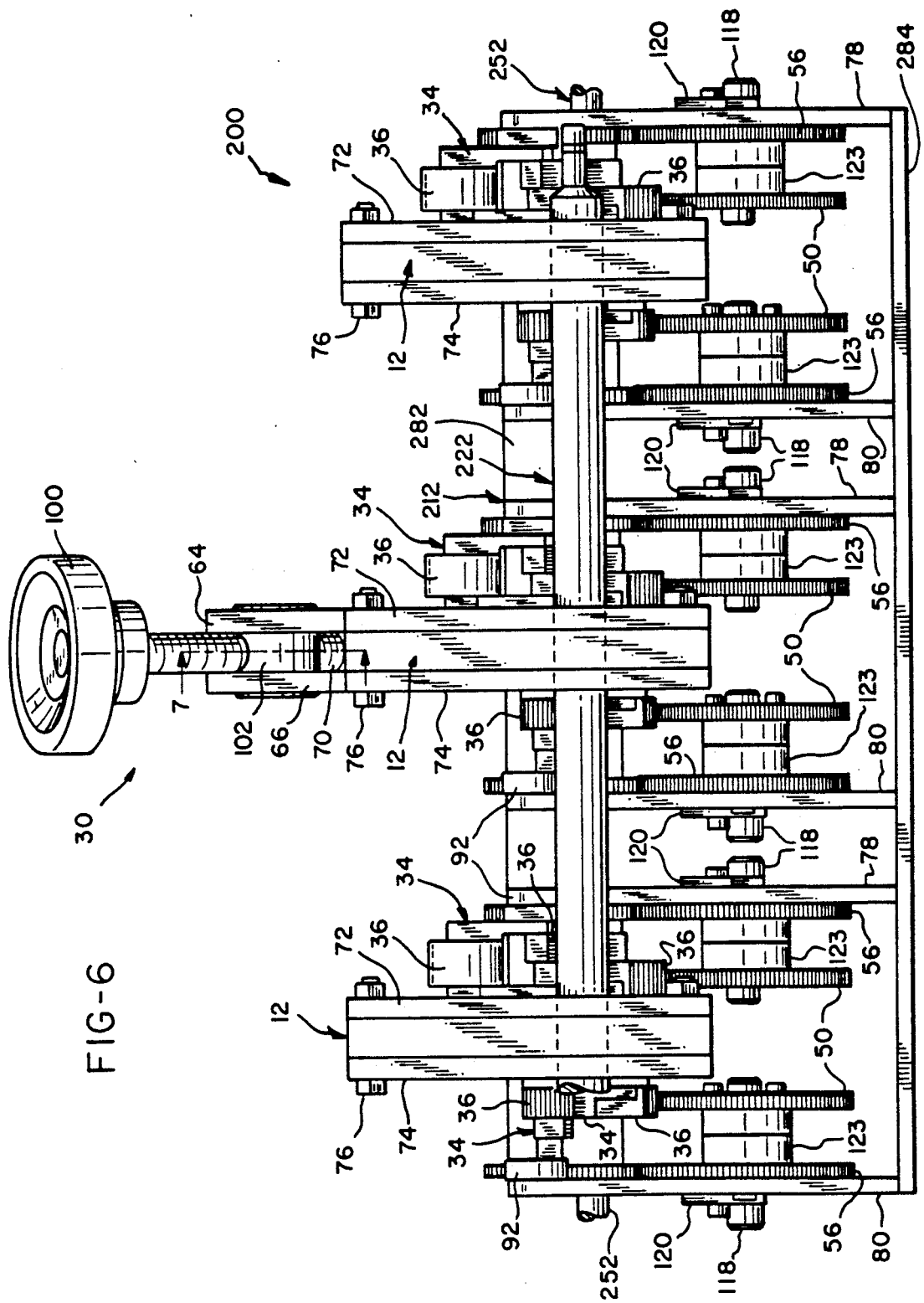

5,036,716

INFINITELY VARIABLE TRANSMISSION

BACKGROUND OF THE INVENTION

1. Field of the Invention

The present invention relates to an infinitely variable mechanical power transmission system.

2. Description of the Prior Art

Conventional mechanical power transmission systems include adjustments which allow the mechanical advantage of a power transmission to be adjusted in large, incremental steps. For example, conventional transmissions employed in automotive vehicles typically include three, four or five step wise adjustments that allow power to be transmitted at corresponding different mechanical advantages. Adjustment of mechanical advantage of power transmission is desirable, since power sources, such as internal combustion engines, provide power outputs that vary nonlinearly with engine speeds. Therefore, the transmission of power which is suitable at one mechanical advantage for an engine operating at a low speed is not suitable for the transmission of power from the same engine operating at a higher speed.

In conventional power transmission systems, each incremental step or adjustment in the transmission of power from a rotary shaft involves separate gear systems which are alternatively engageable for transmitting power from a rotary input shaft at a predetermined mechanical advantage. The choices of mechanical advantage are extremely limited, and are ideal only for specific engine speeds within the total range of engine speeds. Thus, conventional mechanical power transmissions necessarily operate at optimum efficiency only during the very small intervals of time at which the engine is operating at the specific speed for which the selected transmission gear system is optimally suited. At all other times power is transmitted at a reduced efficiency.

Various different infinitely variable rotary power transmission systems have been devised to transmit power at infinitely variable selections. For example, U.S. Pat. No. 4,616,478 describes a rotatable hydrostatic transmission in which the mechanical advantage of power transmission is varied using a hydraulic fluid transmission system. However, hydraulic fluid transmission systems are susceptible to failure due to hydraulic fluid leaks. Furthermore, such systems often involve significant power losses due to high fluid friction since there is a considerable amount of hydraulic fluid flow through very narrow hydraulic fluid transfer lines and passageways.

SUMMARY OF THE INVENTION

A primary object of the present invention is to provide a power transmission system which is totally mechanical in operation and which does not employ hydraulic fluid, yet which allows the mechanical advantage of power transmission to be adjustable in an infinite number of increments. The power input is provided through a rotating power input drive shaft, and the power output is likewise through a rotating power output drive shaft. The power input drive shaft is journaled relative to an input drive mount, while the output drive shaft is journaled relative to an output drive mounting frame. The mechanical advantage which is achieved in the transmission of power from the input shaft to the output shaft is governed by the relative positions of the input drive mount and the output drive mounting frame.

The change in relative positions of the input drive mount and the output drive mounting frame controls the effective radius of angular rotation of intermediate power transfer links that are engaged to transmit power to the rotary output shaft. The greater the lever arm or effective radius of rotation of the intermediate power transfer links, the greater will be the angular velocity at which the rotary output shaft is driven. Conversely, if the lever arm or effective radius of rotation of the intermediate power transfer links that drive the output is reduced, the velocity of angular rotation of the output shaft will be reduced as well.

It is well known that the diameter of a rotary input that is engaged with a rotary output controls the mechanical advantage of power transmitted from the input to the output. The length of the radius of the rotary input may be considered to be the length of a lever arm at which the input acts upon the output. If the pitch diameter of an input gear or the diameter of a pulley driving a belt is equal to the pitch diameter of a meshed output gear or the diameter of a pulley driven by the belt, the mechanical advantage will be at a ratio of one to one. With the pitch diameters of an input and an output being equal, a single rotation of the rotating input will produce a single rotation of the output that is driven in rotation. The velocity of angular rotation of the input and that of the output are equal.

On the other hand, if the diameter of a rotating input is twice that of the output, the rotating output will be driven at an angular velocity twice that of the input. Conversely, if the diameter of the driving input is only half that of the driven output, one complete rotation of the driving input will rotate the driven output through only one half of a complete rotation. The mechanical advantage provided by the driving input to the driven output is therefore directly proportional to the diameter of the driving input to the diameter of the driven output.

In a conventional mechanical power transmission system changes to the mechanical advantage of power transmission are performed by selectively and alternatively engaging intermediate driving inputs of different diameters with a single driving output. Since each intermediate driving input has a fixed diameter, the mechanical advantage achieved using any single intermediate driving input is fixed, and cannot be altered. Adjustment can only be performed by selectively and alternatively engaging a different intermediate power transfer input element, such as a gear, with the power output. The increments of adjustment are therefore limited by the number of different diameters of the several power transfer input elements. In conventional mechanical power transmission systems large numbers of different increments of adjustment in mechanical advantage of power transmission are impractical, due to the volume of space occupied by each power transfer input element.

The infinitely adjustable mechanical transmission of the present invention differs from conventional mechanical transmissions in that different power transfer input elements are not required in order to achieve changes in the effective diameter or radius of the driving input elements. To the contrary, a single set of intermediate power transfer links are provided and are sequentially, not selectively, engageable with the driven output. Since these intermediate links are not continuously engaged with the driven output, they can be rotated relative to the driven output about any different radius of rotation. The radius of rotation is controlled by varying the orientation of the output drive mounting frame relative to the input drive mount through a continuously variable adjustment mechanism.

Since the same set of power transfer elements are utilized to effectuate rotation about all possible different driving radii, the transmission of the present invention is not subject to the large space requirements which are necessary to accommodate each different power transfer element that is required in a conventional mechanical transmission to achieve a selected mechanical advantage.

In one broad aspect the present invention is a transmission for transmitting rotary motion at a selected mechanical advantage comprising: an input drive mount having a power input transfer means that is mounted on the input drive mount and disposed to reside in a flat plane for rotation about an axis perpendicular thereto; an output drive mounting frame having a transfer drive coupling axle oriented parallel to the axis of rotation of the power input transfer means and coupled to the input drive mount at an axis of rotation parallel to the axis of rotation of the power input transfer means; adjustable means for immobilizing the output drive mounting frame relative to the input drive mount at a selected orientation relative thereto, thereby holding the transfer drive coupling axle at a selected distance from the axis of rotation of the power input transfer means; a plurality of transfer links rotatably secured to the power input transfer means at uniform intervals about and at a common distance from the axis of rotation of the power input transfer means; a plurality of intermediate links all rotatably mounted on the transfer drive coupling axle and having toothed gear sections directed radially outwardly therefrom, and wherein each of said intermediate links is rotatably coupled to a separate one of the transfer links; and drive output gear means residing in sequential and discontinuous meshed engagement with the toothed gear sections of the intermediate links and mounted on the output drive mounting frame and including a power output drive means.

The input drive mount is preferably comprised of a flat plate oriented in a flat plane and the power input transfer means has opposite parallel faces and is mounted for rotation in an opening in the flat plate. The power input transfer means is preferably a spur gear, but can be any other type of rotary mechanical power transfer device, such as a chain driven sprocket or a belt driven pulley.

The output drive mounting frame is preferably comprised of a pair of parallel arms that are rigidly coupled together and held apart by transverse, rigid connectors that extend through the plane of the input drive mounting plate outside of the boundaries thereof. The arms extend parallel to the flat input drive mounting plate and parallel to the opposite faces of the power input transfer means on opposite sides thereof. Each of the arms has a separate transfer drive coupling axle. The transfer drive coupling axles are mutually coaxial and longitudinally offset from each other on opposite sides of the input drive mounting plate so as to lie on a common axis. The transfer drive coupling axles extend from the arms of the output drive mounting frame toward the power input transfer means from opposite sides thereof.

The system is preferably comprised of a pair of sets of the transfer links and a pair of sets of the intermediate links of the type previously described. The transfer links in one of the sets of transfer links are coupled to one of the faces of the power input transfer means and the transfer links in the other of the sets of transfer links are coupled to the other of the faces of the power input transfer means rotatably secured to the power input transfer means at uniform intervals about and at a common distance from the axis of rotation of the power input transfer means. Each set of transfer links is disposed on an opposite side of the power input transfer means.

The intermediate links in one of the sets of intermediate links are coupled to one of the separate transfer drive coupling axles and the intermediate links in the other of the sets of intermediate links are coupled to the other of the separate transfer drive coupling axles. The system thus includes duplicate sets of the power transfer links and duplicate sets of the intermediate links with one set of each disposed on the two opposite sides of the input drive mounting plate.

The transfer links in each of the sets in the pair of sets are rotatably secured to the power input transfer means at locations angularly offset from each other about the axis of rotation of the power input transfer means. For example, if there are three transfer links in each set, these transfer links are rotatably secured to the power input transfer means at locations on the periphery of the power input transfer means at intervals of one hundred twenty degrees about the entire circumference of the power input transfer means. If four transfer links are employed in each set, they are secured ninety degrees apart about the periphery of the power input transfer means. Furthermore, the connections of the transfer links in each set to the power input transfer means are angularly spaced from the transfer links in the other set by a uniform distance. Thus, with two sets of three transfer links each, each connection of a transfer link to the power input transfer means is at an angular spacing of sixty degrees from the connections on either side thereof. For two sets of four transfer links each the uniform interval of spacing between adjacent connections is forty five degrees about the circumference of the power input transfer means.

Increase of ratio of power transfer can be enhanced even further by providing a plurality of each of the input drive mounting plates, power input transfer means, pairs of arms on the output drive mounting frame, pairs of set of transfer links, and pairs of set of intermediate links as previously described. The several input drive mounting plates are located in a parallel array, separated from each other and interleaved with the arms on the output drive mounting frames. Each of the input drive mounting plates is bracketed by a pair of arms on the output drive mounting frame.

By angularly offsetting the points of connection of each of the power transfer links to the several rotatable power input transfer gears or other driving disks in all the sets of power transfer links, smoothness in power transfer is enhanced by the offset in meshing and unmeshing of the intermediate links with the different drive output gears. The different drive output gears are all coupled to drive a common power output shaft and the different power input transfer means are all driven by a common power input shaft.

To achieve infinitely variable adjustments in mechanical advantage the adjustment means for altering the relative orientation between the output drive mounting frame and the input drive mount may take the form of a worm adjustment. The worm adjustment is longitudinally immobilized and freely rotatable relative to either the input drive mount or the output drive mounting frame, and is threadably engaged with the other of these elements. The worm adjustment preferably lies in the plane of the input drive mounting plate and is connected between the input drive mounting plate and the output drive mounting frame.

The output drive gear is connected to an output drive shaft that is mounted for rotation in an output drive bearing mount of the output drive mounting frame. The output drive shaft also extends through an output drive collar of the input drive mounting plate. The worm adjustment thereby serves as an adjustable link and the output drive shaft serves as a fulcrum for varying the angular orientation of the output drive mounting frame relative to the input drive mounting plate. Adjustable rotation of the worm link causes the output drive mounting frame to rotate relative to the input drive mounting plate about the axis of the output drive shaft. This rotation carries the transfer drive coupling axle through an arc although the transfer drive coupling axle remains parallel to the axis of rotation of the power input transfer means and at a selected distance therefrom as determined by the extent of rotation of the adjustable worm link.

The invention may be described with greater clarity and particularity with reference to the accompanying drawings.

DESCRIPTION OF THE DRAWINGS

FIG. 1 is a side elevational view of one embodiment of the infinitely variable mechanical transmission according to the invention.

FIG. 2 is a bottom plan view of the embodiment of FIG. 1 taken along the lines 2—2 thereof.

FIG. 3 is an elevational detail taken along the lines 3—3 of FIG. 2 and showing the infinitely variable transmission showing one face of an input drive gear and adjusted to transmit mechanical motion at one mechanical advantage.

FIG. 3A is an elevational detail taken along the lines 3A—3A of FIG. 2 showing the opposite face of the input drive gear from that of FIG. 3.

FIG. 4 is an elevational detail showing the transmission components of FIG. 3 in an alternative position of adjustment.

FIG. 5 is an elevational detail showing the transmission components of FIG. 3 in still another alternative position of adjustment.

FIG. 6 is a rear elevational view of an alternative embodiment of the invention of the infinitely variable transmission showing the connection of replicate sets of transmission elements of the embodiment of FIG. 1.

FIG. 7 is a sectional elevational detail taken along the lines 7—7 of FIG. 6.

DESCRIPTION OF THE EMBODIMENTS

FIGS. 1-5 illustrate an infinitely variable mechanical transmission assembly 10 comprising a single flat input drive mounting plate 12. The assembly 10 is also comprised of an input power transfer means 14 which includes a flat input power transfer spur gear 16 mounted in one portion of an opening 18 in the input drive mounting plate 12, an input drive spur gear 20 mounted in another portion of the opening 18 and on input drive shaft 22. The opening 18 is shaped much in the form of the numerical figure "8". The input power transfer spur gear 16 is mounted in one of the loop-like portions of the opening 18 and rotates about an axis of rotation 17 that is perpendicular to the plate 12. The gear 16 is driven by the input drive gear 20 which is mounted in the other loop-like portion of the opening 18. The gear 20 is locked to and driven by the input drive shaft 22. The input drive gear 20 and the power input transfer drive gear 16 are in permanent meshed engagement with each other as best illustrated in FIG. 1.

The transmission 10 is also comprised of an output drive mounting frame 24 disposed adjacent to the input drive mounting plate 12. The output drive mounting frame 24 has a pair of coaxial transfer drive coupling axles 26 secured thereto. The transmission 10 also includes a means 30 which is an adjustable link for holding the output drive mounting frame 24 at a selected orientation relative to the input drive mounting plate 12, whereby the transfer drive coupling axles 26 are held parallel to the axis 17 of the power input transfer gear 16 of the input power transfer means 14. The transfer drive coupling axles 26 and the axis 17 of rotation of the transfer drive gear 16 are held mutually parallel to each other and at a distance spaced from each other that is determined by the orientation of the output drive mounting frame 24 relative to the input drive mounting plate 12.

The variable transmission 10 also includes a plurality of transfer links 32 which are rotatably coupled to the input power transfer gear 16 at uniform intervals about the axis of rotation 17 of the input power transfer gear 16, as best illustrated in FIGS. 3, 3A, 4 and 5. There are two sets of transfer links 32, a separate set being located on the opposite sides 60 and 62 of the input drive mounting plate 12 as shown in FIGS. 2, 3 and 3A.

There are three transfer links 32 in each set of transfer links. A plurality of gear tooth links 34 are all rotatably secured to the transfer drive coupling axles 26. The gear tooth links 34 are likewise arranged in two sets with the gear tooth links 34 in each set being located on opposite sides 60 and 62 of the input drive mounting plate 12 and rotatable mounted on a separate one of the transfer drive coupling axles 26, also as shown in FIG. 2.

There are three gear tooth links 34 in each set of gear tooth links on each side 60 and 62 of the input mounting plate 12. All of the gear tooth links 34 have gear tooth sections 36 extending radially outwardly from the transfer drive coupling axles 26. Each of the gear toothed links 34 is rotatably coupled to a separate one of the transfer links 32.

The infinitely variable mechanical transmission 10 also has a drive output gear means 49, including a pair of drive output gears 50 one each being located on an opposite side of the drive input mounting plate 12. Each of the drive output gears 50 is sequentially and discontinuously engaged by each of the gear tooth sections 36 of each of the gear tooth links 34 in the set of gear tooth links located on the same side of the drive input mounting plate 12. Each drive output gear 50 is coupled by gearing to a single output drive shaft 52, visible in FIGS. 1 and 2. The output drive shaft 52 is journaled for rotation relative to the output drive mounting frame 24 and is engaged by means of two sets of intermediate gears 54 and 56 to the drive output gears 50.

Since the gear tooth links 34 in each set are mounted about a common transfer drive coupling axle 26, the gear tooth sections 36 of the gear tooth links 34 in each set of gear tooth links are of varying widths. That is, the teeth of the gear tooth sections 36 on the gear tooth links 34 closest to the output drive mounting frame arms are the widest, since they must extend inwardly toward the input mounting plate 12 in order to establish coplanar relationship with a drive output gear 50. The gear tooth sections 36 on the gear tooth links 34 furthest from the output drive mounting frame arms and closest to the input drive mounting plate 12 are the narrowest, since those gear tooth links 34 are in coplanar alignment with the output gears 50.

The input drive mounting plate 12 is a flat steel slab having opposite parallel surfaces 60 and 62. At the upper right-hand edge of the flat plate 12, as viewed in FIG. 1, a pair of adjustment mounting plates 64 and 66 are fastened by means of bolts 68 against the opposite surfaces 60 and 62 of the flat plate 12 to support the adjustable link 30 in a manner hereinafter to be described. At the opposite end of the plate 12 there are a pair of flat plates 72 and 74 secured by means of bolts 76 against the opposite, parallel surfaces 60 and 62 of the plate 12, respectively. The plates 72 and 74 are both provided with semi-circular notches that accommodate the passage therethrough of the input drive shaft 22. The plates 72 and 74 serve to laterally constrain the input drive gear 20 which is locked onto the input drive shaft 22 and to hold the gear 20 in the plane of the plate 12.

The output drive mounting frame 24 is equipped with a pair of arms 78 and 80 which are each formed in an L-shaped or angle shaped configuration. The pair of arms 78 and 80 are of a mutually congruent configuration and are held in spaced separation from each other by laterally extending straps 82 and 84. The straps 82 and 84 are welded to the opposite ends of the arms 78 and 80 to hold the arms 78 and 80 rigidly immobilized relative to each other and parallel to each other and parallel to the faces 60 and 62 of the input drive mounting plate 12. Each of the arms 78 and 80 of the output drive mounting frame 24 is provided with a separate one of the transfer drive coupling axles 26 extending therefrom and toward the input power transfer gear 16. The transfer drive coupling axles 26 serve as transfer drive coupling means.

The infinitely variable mechanical transmission 10 is provided with pairs of sets of the transfer links 32 and pairs of sets of the gear tooth links 34 as aforesaid on the opposite sides of the input drive mounting plate 12. The input power transfer gear 16 has opposite parallel faces 86 and 88 that are perpendicular to the axis of rotation 17 thereof. The arms 78 and 80 of the output drive mounting frame 24 are held proximate and parallel to the faces 86 and 88 and are spaced laterally therefrom. One of the sets of transfer links 32 and one of the sets of gear tooth links 34 is deployed between the arm 78 and the face 86 of the input power transfer gear 16. The other of the sets of transfer links 32 and the other of the sets of gear tooth links 34 are deployed between the other arm 80 and the other face 88 of the input power transfer gear 16.

All of the transfer links 32 are rotatably coupled to the power transfer gear 16 at locations angularly offset from each other. The transfer links 32 are each secured at their respective first ends to the periphery of the power input transfer gear 16 at spaced locations therealong.

The transfer links 32 are each mounted for rotation relative to a single one of six transfer link mounting stub axles 90 that extend outwardly from the faces 86 and 88 of the input power transfer gear 16. Since there are three transfer links 32 disposed adjacent to the face 86 of the input power transfer gear 16, there are three stub axles 90 extending laterally outwardly from the face 86. Each of the stub axles 90 is located one hundred twenty degrees from the other two stub axles that extend outwardly from the face 86 relative to the axis of rotation 17. Likewise, on the opposite face 88 three different stub axles 90 extend outwardly from the face 88 at angularly offset intervals of one hundred twenty degrees relative to each other, as illustrated in FIG. 3A.

The stub axles 90 extending from the opposite faces 86 and 88 of the power input transfer gear 16 are also angularly offset from each other at equal intervals of sixty degrees, so that the transfer links 32 are hinged for rotation about the stub axles 90 at uniform angularly offset intervals of sixty degrees about the periphery of the power input transfer gear 16. The stub axles 90 projecting outwardly from the face 86 of the transfer gear 16 alternate in sequence with those projecting outwardly from the face 88 thereof. The second ends of the transfer links 32 are rotatably connected to the gear tooth links 34 for rotation relative thereto by rotatable pin connectors 91. The gear tooth links 34 serve as intermediate links between the transfer links 32 and the drive output gears 50.

Each of the axles 26 is an inwardly directed stub axle that extends toward the input drive mounting plate 12. Each stub axle 26 carries a set of three gear tooth links 34 rotatably mounted thereon. The gear toothed links 34 rotate about the stub axles 26 independently of each other, except as constrained in movement by the transfer links 32 and by the rotation of the power input transfer gear 16. A nylon bushing 92 is interposed between each of the arms 78 and 80 of the output drive mounting frame 24 and the outermost gear tooth link 34 in each set. The teeth of each gear tooth section 36 are large, spur gear teeth which are engaged with corresponding large, spur gear teeth on the drive output gear 50, as best depicted in FIGS. 3, 4 and 5.

The adjustable link 30 for holding the output drive mounting frame 24 at a selected orientation relative to the input drive mounting plate 12 includes a drive in the form of a worm screw 70 having an externally threaded shank which can be turned in rotation by means of an adjustment knob 100. The knob 100 and the worm screw 70 are locked to each other. The shank of the worm screw 70 passes through a steel spool 102 which is secured to both of the flanges 64 and 66 by a conventional means, such as welding or adhesive, for example. The spool 102 is thereby mounted on the input drive mounting plate 12 and serves as a frame connector.

The spool 102 is bored out with a transverse smooth walled bore 104, depicted in FIG. 7, that receives the shank of the worm screw 70. The worm screw shank is not threadably engaged in the bore 104, but is laterally constrained therewithin. The shank of the worm screw 70 is provided with a neck 106 of reduced diameter that is located in that portion of the worm screw shank which resides within the confines of the bore 104 of spool 102. The spool 102 is also tapped with another internal threaded bore oriented perpendicular to the bore 104. This tapped bore receives an allen head screw 108. The internal tip of the screw 108 projects into the annular recess in the worm screw shank formed by the neck 106. The screw 108 thereby longitudinally immobilizes the worm screw 70 relative to the spool 102, but allows it to rotate freely therewithin, within the confines of the bore 104. The worm screw 70 is thereby secured to the flat input drive mounting plate 12, but is rotatable relative thereto.

The opposite end of the shank of the worm screw 70 is threadably engaged in a coaxial internally tapped bore in a nut 110 which is held by a pair of lugs 111 in a gimbaled connection between a pair of angle brackets 112 and 114. The gimbaled nut 110 is thereby mounted on the output drive mounting frame 24 and serves as an adjustable plate connector. The angle brackets 112 and 114 are secured by bolts 116 to the strap 82 that joins corresponding front ends of the parallel arms 78 and 80 together.

Rotation of the knob 100 in one direction of rotation causes the shank of the worm screw 70 to rotate freely within the spool 102 and to draw the gimbaled nut 110 upwardly toward the spool 102. Rotation of the knob 100 in the opposite direction of rotation causes the shank of the worm screw 70 to freely turn within the spool 102 in the opposite direction, and to push the gimbaled nut 110 away from the spool 102.

Input power to the infinitely variable transmission 10 is through an input drive shaft 22 which is welded or otherwise locked onto the input drive gear 20. The drive input gear 20 is held in the plane of the input drive mounting plate 12 by the plates 72 and 74 on either side thereof and is engaged in mesh with the transfer gear 16. Rotation of the transfer gear 16 carries the stub axles 90 and the transfer links 32 in rotation about the axis of rotation 17 of the input power transfer gear 16. The transfer links 32 in turn sequentially carry the gear tooth links 34 in rotation past the drive output gears 50 by means of the rotatable pin connectors 91.

As each of the gear tooth links 34 approaches a drive output gear 50, the gear teeth in the gear toothed section 36 thereof engage in mesh with the drive output gear 50, thereby as illustrated in FIG. 3 and as illustrated in phantom in FIG. 3A, turning the drive output gear 50 in rotation. As the gear teeth of the gear tooth section 36 of one gear tooth link 34 recede from the drive output gear 50 and disengage therefrom, the next sequential gear toothed link 34 in the same set of gear tooth links is brought into proximity to the drive output gear 50, and the teeth in the gear tooth section 36 thereof mesh in driving relationship and continue the rotation of the drive output gear 50.

Each drive output gear 50 is locked onto and turns with a shaft 118. The intermediate gear 56 on the same side of the plate 12 is likewise locked for rotation with the same shaft 118. Each shaft 118 is journaled for rotation relative to an arm of the output drive mounting frame 24. As depicted in FIG. 2, there are duplicate drive output gears 50 on the opposite sides of the input drive mounting plate 12. One drive output gear 50 and the gear 56 associated therewith are locked for rotation with a shaft 118 that is journaled in a bearing mount for rotation relative to arm 78, while the other drive output gear 50, and its associated intermediate gear 56, are locked for rotation with a shaft 118 that is journaled in a bearing mount in the other arm 80 of the output drive mounting frame 24.

The outwardly protruding ends of the shafts 118 both include necked-down portions which are embraced within the fingers of yoke plates 120 that are secured to the output drive mounting frame arms 78 and 80 in which the shafts 118 are carried. The yoke plates 120 thereby hold the gears 56 and 50 at specific distances from the input drive mounting plate 12 so that these gears mesh properly with the other transmission elements. That is, the yoke plates 120 prevent the shafts 118 from moving perpendicular to the output drive mounting frame arms 78 and 80 so that the drive output gears 50 reside in coplanar relationship with the gear tooth sections 36 of the gear tooth links 34. Spacing collars 123 on the shaft 118 extend between each output drive gear 50 and an intermediate gear 56 mounted coaxially therewith on the same shaft 118. This ensures that the intermediate gears 56 reside in coplanar relationship with the intermediate gears 54 with which they are meshed.

The gears 54 are rigidly secured to collars 122 and 124, which in turn are rigidly secured to the output drive shaft 52 by means of set screws 126. The collar 124 substantially spans the distance between an intermediate gear 54 and the mounting frame arm 80 to longitudinally immobilize the output drive shaft 52 relative to the output drive mounting frame 24. This ensures that the intermediate gears 54 and 56 on each side of the input drive mounting plate 12 reside in proper coplanar meshed engagement. The apertures in the mounting frame arms 78 and 80 thereby form journaled output drive bearing mounts.

The output drive shaft 52 passes through an opening in the flat input drive mounting plate 12. The region of the input drive mounting plate 12 immediately surrounding this opening thereby serves as an output drive collar that is spaced laterally from the frame connector formed by the spool 102. The output drive shaft 52 passes through this collar and is freely rotatable therewithin. The shaft 52 thereby serves as a fulcrum for rotation of the output drive mounting frame 24 during adjustment of the adjustment link 30 for varying the angular orientation and for holding the output drive mounting frame 24 at a selected orientation relative to the input drive mounting plate 12. The adjustable plate connector formed by the gimbaled nut 110 is spaced laterally in one lateral direction from the output drive bearing mounts for the output drive shaft 52 defined in the arms 78 and 80. The transfer drive coupling means formed by the stub axles 26 are spaced from the output drive bearing mounts in the opposite lateral direction.

The mechanical advantage of power transmission can be infinitely varied by operation of the adjustment means 30. Rotation of the knob 100 is performed manually so as to rotate the worm screw 70 to draw the gimbaled nut 110 toward the spool 102, or to push it further therefrom. When the gimbaled nut 110 is drawn toward the spool 102 by rotation of the worm screw 70 in one direction, the arms 78 and 80 of the output drive mounting frame 24 are rotated in a counter-clockwise direction about the output drive shaft 52, as viewed in FIG. 1. The output drive shaft 52 serves as a fulcrum in the relative rotation of the output drive mounting frame 24 relative to the input drive mounting plate 12. When the knob 100 is turned in the opposite direction to push the gimbaled nut 110 away from the spool 102, the arms 78 and 80 are rotated in a clockwise direction about the fulcrum formed by the output drive shaft 52, again as viewed in FIG. 1. Rotation of the output drive mounting frame 24 relative to the input drive mounting plate 12 causes the stub axles 26 upon which the gear tooth links 34 are rotatably mounted to approach or recede from the axis of rotation 17 of the input power transfer gear 16.

FIG. 3 illustrates one intermediate position of adjustment of the infinitely variable transmission 10 in which the stub axles 26 projecting inwardly toward the input drive mounting plate 12 and about which the gear tooth links 34 rotate, are coaxial with the axis of rotation 17 about which the input power transfer gear 16 rotates. In this condition each of the gear tooth links 34 is sequentially brought into engagement with a drive output gear 50 in a rotational movement having an effective moment arm equal to the distance from axis 130 of the stub axles 26 to the gear teeth in the gear tooth sections 36. This lever arm is therefore equal to the distance between the points indicated at 130 and 128 in FIG. 3.

As each intermediate gear tooth link 34 leaves meshed engagement with a drive output gear 50, the next sequential gear tooth link 34 in the same gear tooth link set is brought into meshed engagement with the drive output gear 50. This next sequential gear toot link 34 also acts at a lever arm equal to the distance between the axis of rotation 130 and the point 128. Thus, there is a continuous driving force imparted to the drive output gears 50. The drive output gears 50, in turn, transmit a driving output through the gears 56 and 54 to the output drive shaft 52. With the worm screw 70 adjusted so that the axis of rotation 130 of the gear tooth links 34 coincides with the axis of rotation 17 of the input power transfer gear 16.

The pitch diameters of the gears 16, 20, 50, 54 and 56 are equal in infinitely variable mechanical transmission 10. One complete rotation of the input drive shaft 22 through three hundred sixty degrees will produce a rotation of the output drive shaft 52 through one complete rotation plus approximately an additional seventy degrees. That is, the output drive shaft 52 will rotate through an angular distance of about four hundred thirty degrees. However, this mechanical advantage can be infinitely adjusted as desired by the user using the adjustable link 30.

For example, if the link 30 is adjusted by turning the adjustment knob 100 to drive the gimbaled nut 110 away from the spool 102, the arms 78 and 80 will be moved in angular rotation in a clockwise direction relative to the input drive mounting plate 12, as viewed in FIG. 1, about the fulcrum provided by the output drive shaft 52. This will cause the stub axles 26 to be carried upwardly and away from coaxial alignment with the axis of rotation 17 of the transfer gear 16. The stub axles 26 will remain coaxial with each other and parallel to the axis of rotation 17 of the transfer gear 16, but will be separated therefrom by the distance between the points 17 and 130, as illustrated in FIG. 4. The translocation of the axis 130 of the stub axles 26 relative to the axis of rotation 17 of the transfer gear 16 is possible because the transfer links 32 are hinged to the transfer gear 16 by means of stub axles 90 and to the gear toothed links 34 by pivot pins 91.

With the transmission 10 adjusted as depicted in FIG. 4, as the teeth of each tooth section 36 of each gear tooth link 34 are brought into meshed engagement with the teeth of the drive output gear 50, the associated transfer link 32 rotates counter clockwise about its stub axle 90, relative to the transfer gear 16. This causes the pivot pin 91 connecting that gear tooth link 34 to its associated transfer link 32 to move radially inwardly across the face of the transfer gear 16 from the periphery thereof to close proximity to the axis of rotation 17 of the transfer gear 16.

This movement reduces the effective moment arm of rotation of that gear toothed link 34 from the distance between the points 128 and 130 by approximately the distance between the point 130 and the axis of rotation 17. Thus, the effective lever arm applied to the gear tooth link 34 as it meshes with the drive output gear 50 is equal to approximately the distance between the point 128 and the axis of rotation 17 of the transfer gear 16.

This much shorter moment arm of the input force turns the drive output gear 50 at a much slower speed. With the pitch diameters of the gears 16, 20, 50, 54 and 56 being equal as aforesaid, two complete rotations of the input drive shaft 22 produce approximately only a single output rotation of the output drive shaft 52. That is, for every two rotations of the input drive shaft 22 the output drive shaft 52 rotates a single time when the adjustment means 30 is such that the stub axles 26 and axis of rotation 17 reside in the relationship indicated in FIG. 4.

Conversely, when the worm screw 70 is turned in the opposite direction so as to draw the gimbaled nut 110 toward the spool 102, the arms 78 and 80 of the output drive mounting frame 24 are rotated counter-clockwise, as viewed in FIG. 1. Again, rotation is about the fulcrum provided by the output drive shaft 52. With this adjustment the stub axles 26 move in translation from the position depicted in FIG. 4 downwardly to the opposite side of the axis of rotation 17 of the transfer gear 16 to the position depicted in FIG. 5. Again, the stub axles 26 remain parallel to the axis of rotation 17, but are moved to a spaced distance of separation therefrom equal to the distance between the point 130 and the axis of rotation 17, as each gear tooth link 34 is brought into meshed engagement with the drive output gear 50.

As each gear tooth link 34 sequentially approaches meshed engagement with the drive output gear 50, the transfer link 32 to which that gear tooth link 34 is connected, rotates outwardly such that the pivot pin 91 thereof moves away from the axis of rotation 17 until it reaches the position depicted in FIG. 5 at full meshed engagement between the gear tooth link 34 and the drive output gear 50. At this time the effective radius of rotation of the meshed gear tooth link 34 relative to the drive output gear 50 is approximately equal to the distance between the point 128 and the axis of rotation 17 of the transfer gear 16. This effective radius of rotation therefore serves as a much longer lever arm, so as to rotate the drive output gear 50 at an increased speed of angular rotation.

With the adjustable link 30 of the transmission 10 adjusted so that the stub axles 26 are located relative to the axis of rotation 17 of the transfer gear 16 as depicted in FIG. 5, two complete rotations of the drive input shaft 22 will produce one complete rotation plus a rotation of an additional one hundred forty degrees of the output drive shaft 52. That is, as the input drive shaft 22 rotates through a total of seven hundred twenty degrees, the output drive shaft 52 will rotate through approximately five hundred degrees.

The foregoing adjustments of the adjustable link 30 that carry the stub axles 26 in translation parallel to the axis of rotation 17 of the input transfer gear 16 to the positions depicted in FIGS. 3, 4 and 5 are illustrative only. Because the adjustment means 30 employs a worm screw 70, the angular orientation of the output drive mounting frame 24 relative to the input drive mounting plate 12 can be controlled to an extremely fine degree. Each minute adjustment of the distance of separation between the stub axles 26 and the axis of rotation 17 will vary the mechanical advantage of rotation imparted from the input drive shaft 22 to the output drive shaft 52. Thus, with the system employed, any infinite number of variations in mechanical advantage of power transmitted are possible.

Unlike prior art mechanical power transmission systems which require different gears for different adjustments, the infinitely variable transmission 10 employs but a single set of operating components for all different adjustments. Thus, the transmission 10 is capable of operation over a wide range of output shaft speeds without changing the speed of rotation of the input shaft.

While an infinitely variable transmission 10 employing but a single input drive mounting plate 12 and a single output drive mounting frame 24 will function properly over a wide range of adjustments of the adjustable link 30, the duration of engagement of the teeth of the gear tooth links 34 with the teeth of the drive output gear 50 decreases as the distance of separation of the teeth of the drive output gear 50 from the axis of rotation 17 of the transfer gear 16 increases. Thus, the uniformity of the speed of rotation of the drive output gear 50 is likely to vary at the extreme limits of adjustment for high speed and for low speed. Therefore, preferably the infinitely variable transmission of the present invention may advantageously employ a plurality of input drive mounting plates 12 as aforesaid, and a second plurality of arms 78 and 80 as aforesaid. Each of the plates 12 is disposed between a pair of arms 78 and 80. An embodiment of such an infinitely variable transmission is depicted at 200 in FIG. 6.

In the transmission 200 a single output drive mounting frame 212 is employed. The output frame 212 has a plurality of arms 78 and 80 all coupled together by elongated straps 282 and 284 which extend the width of the frame 212 and lock all of the arms 78 and 80 together for movement in tandem. The arms 78 and 80 are arranged in pairs as in the embodiment of FIGS. 1–5, and each pair interacts with an input drive mounting plate 12 located therebetween in the manner previously described. Each of the arms 78 and 80 carries a separate stub axle 26, each projecting toward one of the input drive mounting plates 12. Each of the stub axles 26 carries a set of gear tooth links 34 as aforesaid, each set being located on an opposite side of a power input transfer gear 16 in an input drive mounting plate 12. Each power input transfer gear 16 carries two sets of transfer links 32 as aforesaid.

Since all of the arms 278 and 280 are locked together by straps 282 and 284 that extend across the entire width of the frame 12, they thereby can be moved in tandem under the control of a single adjustable link 30. A single input drive shaft 222 passes through all of the plates 12, and a single output shaft 252 likewise is journaled for rotation relative to all of the arms 78 and 80 of the output drive mounting frame 212.

As previously noted, the first ends of all of the transfer links 32 are rotatably mounted to their associated transfer gear 16 at locations having uniform angular intervals of separation therebetween. Furthermore, in the embodiment of the infinitely variable transmission 200 of FIG. 6 all of the ends of the transfer links 32 are rotatably mounted to their associated transfer gears 16 at locations angularly offset from all other mounting locations. That is, none of the transfer link mounting stub axles 90 is coaxial with any other transfer mounting link axle 90. To the contrary, all of the transfer mounting link stub axles 90 are angularly offset from each other relative to the axis of rotation 17 about which all off the power input transfer gears 16 rotate. With a total of eighteen stub axles 90 there is a stub axle 90 located at every twenty degree interval about the peripheries of the three power input transfer gears 16. As a result, power is imparted to the output gears 50 more evenly.

There are a greater total number of tooth sections 36 to engage the tooth of the several output gears 50. Thus, while the teeth section 36 of an intermediate gear tooth link 34 mounted on one stub axle 26 is entering or leaving meshed engagement with the teeth of the corresponding drive output gear 50, the tooth sections 36 of other gear tooth links 34 on other stub axles 26 reside in fully meshed engagement with the teeth of their corresponding output gears 50. Thus, power may be transmitted more smoothly from the gear tooth links 34 to the drive output gears 50, since at least some gear tooth sections 36 of some of the gear tooth links 34 are in full meshed engagement with the teeth of their drive output gears 50 at all times.

While the embodiment of the infinitely variable transmission 200 depicted in FIG. 6 employs a total of three input drive mounting plates 12 and six output drive mounting frame arms 78 and 80, it is to be understood that the input drive mounting plates and their associated transfer gears and transfer links and the output drive mounting arms and their associated stub axles 26 and gear tooth links 34 may be replicated in any number desired for smoothness of power transmission. Also, while a worm drive 70 has been employed in the adjustable link 30 for rigidly holding the adjustable plate connector formed by the spool 102 at a selected, infinitely variable distance from the frame connector formed by the gimbaled nut 110, other types of infinitely variable adjustment mechanisms could be substituted. Furthermore, while the sizes of the gears 20, 16, 50, 56 and 54 produce certain mechanical advantages over the range of adjustment of the adjustable link 30, gears of different relative sizes can be employed to produce different ratios of mechanical advantage.

Numerous other variations and modifications of the invention will undoubtedly will become readily apparent to those familiar with mechanical transmissions. Accordingly, the scope of the invention should not be construed as limited to the specific embodiments of the invention depicted and described herein, but rather is defined in the claims appended hereto.

I claim:

1. A transmission for transmitting rotary motion at a selected mechanical advantage comprising:
   an input drive mount having a power input transfer means that is mounted on said input drive mount and is disposed to reside in a flat plane for rotation about an axis perpendicular thereto,
   an output drive mounting frame having a transfer drive coupling axle oriented parallel to said axis of rotation of said power input transfer means and coupled to said input drive mount at an axis of rotation parallel to said axis of rotation of said power input transfer means,
   adjustable means for immobilizing said output drive mounting frame relative to said input drive mount at a selected orientation relative thereto, thereby holding said transfer drive coupling axle at a selected distance from said axis of rotation of said power input transfer means,
   a plurality of transfer links rotatably secured to said power input transfer means at uniform intervals about and at a common distance from said axis of rotation of said power input transfer means, a plurality of intermediate links all rotatably mounted on said transfer drive coupling axle and having toothed gear sections directed radially outwardly therefrom, and wherein each of said intermediate links is rotatably coupled to a separate one of said transfer links, drive output gear means residing in sequential and discontinuous meshed engagement with said toothed gear sections of said intermediate links and mounted on said output drive mounting frame and including a power output drive means.

2. A transmission according to claim 1 wherein said input drive mount is comprised of a flat plate oriented in said flat plane and said power input transfer means has opposite parallel faces and is mounted for rotation in an opening in said flat plate.

3. A transmission according to claim 2 wherein said output drive mounting frame is comprised of a pair of parallel arms rigidly coupled together and extending parallel to said flat plate and to said opposite faces of said power input transfer means on opposite sides thereof and wherein each of said arms has a separate transfer drive coupling axle as aforesaid lying on a common axis and extending from said arms toward said power input transfer means from opposite sides thereof, and further comprising a pair of sets of said transfer links and a pair of sets of said intermediate links as aforesaid wherein the transfer links in one of said sets of transfer links are coupled to one of said sides of said power input transfer means as aforesaid and the transfer links in the other of said sets of transfer links are coupled to the other of said sides of said power input transfer means as aforesaid, and the intermediate links in one of said sets of intermediate links are coupled to one of said separate transfer drive coupling axles and the intermediate links in the other of said sets of intermediate links are coupled to the other of said separate transfer drive coupling axles.

4. A transmission according to claim 3 wherein said transfer links in each of said sets in said pair of sets are rotatably secured to said power input transfer means at locations angularly offset from each other about said axis of rotation of said power input transfer means.

5. A transmission according to claim 4 wherein said power input transfer means includes a toothed power input transfer gear and is further comprised of a power input shaft and an input drive gear mounted thereon and in mesh with said power input transfer gear.

6. A transmission according to claim 3 further comprising at least one additional flat plate as aforesaid, power input transfer means, pairs of arms on said output drive mounting frame, pairs of sets of transfer links and pairs of sets of intermediate links as aforesaid.

7. A transmission according to claim 2 further characterized in that said adjustable means is comprised of a worm adjustment longitudinally immobilized and freely rotatably relative to one of said input drive mount and said output drive mounting frame and is threadably engaged with the other thereof.

8. An infinitely variable mechanical transmission comprising:

a flat input drive mounting plate, an input power transfer means mounted relative to said input drive mounting plate for rotation about an axis perpendicular thereto, an output drive mounting frame disposed adjacent to said input drive mounting plate and having a transfer drive coupling axle secured thereto, adjustable means for holding said output drive mounting frame at a selected orientation relative to said input drive mounting plate whereby said transfer drive coupling axle is held parallel to said axis of said input power transfer means and at a distance therefrom determined by the orientation of said output drive mounting frame relative to said input drive mounting plate, a plurality of transfer links rotatably coupled to said input power transfer means at uniform intervals about said axis of rotation of said input power transfer means, a plurality of gear tooth links all rotatably secured to said transfer drive coupling axle and all having gear tooth sections extending radially outwardly therefrom, each gear tooth link being rotatably coupled to a separate one of said transfer links, drive output gear means being sequentially and discontinuously engaged by each of said gear tooth sections of said gear tooth link, and an output drive shaft journaled for rotation relative to said output drive mounting frame and engaged with said drive output gear means.

9. An infinitely variable transmission according to claim 8 wherein said input power transfer means has opposite parallel faces perpendicular to said axis of rotation thereof, and said output drive mounting frame is equipped with at least a pair of arms rigidly immobilized relative to each other and extending parallel to each other and to said faces of said input power transfer means on opposite sides thereof, and each of said arms is provided with a drive coupling axle extending therefrom toward said input power transfer means, and further comprising pairs of sets of said transfer links and pairs of sets of said gear tooth links as aforesaid, wherein one of said sets of transfer links and one of said sets of gear tooth links is deployed between one of said arms and one of said faces of said input power transfer means as aforesaid and the other of said sets of transfer links and the other of said sets of gear tooth links is deployed between the other of said arms and the other of said faces of said input power transfer means.

10. An infinitely variable transmission according to claim 9 further characterized in that all of said transfer links are rotatably coupled to said input power transfer means at locations angularly offset from each other.

11. An infinitely variable transmission according to claim 10 further comprising at least one additional flat input drive mounting plate as aforesaid, wherein said flat input drive mounting plate are all locked together in mutually parallel alignment, and said output drive mounting frame is comprised of additional arms as aforesaid, whereby each flat input drive mounting plate is disposed between a pair of arms as aforesaid.

12. An infinitely variable transmission according to claim 10 further characterized in that said output drive shaft is journaled for rotation relative to all of said arms and passes through said flat input drive mounting plate perpendicular thereto and is freely rotatable relative thereto, whereby adjustment of said means for holding said output drive mounting frame relative to said input drive mounting plate moves said frame in rotation relative to said plate about the axis of said output drive shaft.

13. An infinitely variable transmission according to claim 12 further characterized in that said means for holding said output drive mounting frame relative to said input drive mounting plate is comprised of a worm adjustment mechanism interconnecting said input drive mounting plate with said output drive mounting frame.

14. An infinitely variable transmission according to claim 8 wherein said gear tooth sections are each comprised of a plurality of spur gear teeth and said drive output gear means is comprised of a spur gear sequentially and discontinuously meshed with said spur gear teeth of each of said gear tooth sections.

15. An infinitely variable mechanical transmission comprising:
- an input drive mounting plate having a frame connector and an output drive collar spaced laterally from said frame connector,
- an input driving gear mounted for rotation relative to said input drive mounting plate at a location spaced laterally from said frame connector and from said output drive collar,
- an output drive mounting frame disposed parallel to said input drive mounting plate and having an output drive bearing mount, an adjustable plate connector spaced laterally from said output drive bearing mount in one lateral direction and transfer drive coupling means spaced laterally from said output drive bearing mount in an opposite lateral direction,
- an output drive shaft mounted for rotation in said output drive bearing mount of said output drive mounting frame and extending through said output drive collar of said input drive mounting plate,
- an adjustable link for rigidly holding said adjustable plate connector at a selected infinitely variable distance from said frame connector, whereby said output drive shaft serves as a fulcrum for varying the angular orientation of said output drive mounting frame relative to said input drive mounting plate by adjustment of said adjustable link,
- a transfer gear disposed in the plane of said input drive mounting plate and engaged with said input driving gear,
- a plurality of transfer links extending parallel to the plane of said input drive mounting plate and having first ends rotatably mounted to the periphery of said transfer gear at spaced locations therealong and having opposite second ends,
- plurality of gear tooth links all having gear sections defined thereon and all rotatably coupled together and to said transfer drive coupling means along a common axis and disposed parallel to the plane of said input drive mounting plate, each gear tooth link being rotatably connected to a second end of a separate one of said transfer links, and
- output gear means mounted for rotation on said output drive mounting frame to drive said output drive shaft and being successively and discontinuously engaged by said gear sections.

16. An infinitely variable transmission according to claim 15 further characterized in that said output drive mounting frame is comprised of a pair of arms disposed on opposite sides of said input drive mounting plate in parallel alignment therewith, and said transfer drive coupling means is comprised of a pair of axially aligned transfer drive coupling axles, each of which extends from a separate one of said arms toward said input drive mounting plate, and said transfer links and said gear tooth links are arranged in separate sets on opposite sides of said input drive mounting plate, each set being coupled to a separate one of said transfer drive coupling axles.

17. An infinitely variable transmission according to claim 16 wherein said first ends of all of said transfer links are rotatably mounted to said transfer gear at locations having uniform angular intervals of separation therebetween.

18. An infinitely variable transmission according to claim 17 further comprising at least one additional input drive mounting plate as aforesaid and a plurality of arms as aforesaid, wherein each input drive mounting plate is disposed between a pair of arms as aforesaid.

19. An infinitely variable transmission according to claim 15 wherein said adjustable link is a worm shaft longitudinally immobilized and freely rotatable within one of said plate and frame connectors and threadably engaged in the other of said plate and frame connectors.

* * * * *